United States Patent
Swanson

(10) Patent No.: US 11,176,242 B2
(45) Date of Patent: Nov. 16, 2021

(54) INTELLIGENT POP-UP BLOCKER

(71) Applicant: Malwarebytes Inc., Santa Clara, CA (US)

(72) Inventor: Douglas Stuart Swanson, Holmfirth (GB)

(73) Assignee: Malwarebytes Inc., Santa Clara, CA (US)

( * ) Notice: Subject to any disclaimer, the term of this patent is extended or adjusted under 35 U.S.C. 154(b) by 416 days.

(21) Appl. No.: 16/203,563

(22) Filed: Nov. 28, 2018

(65) Prior Publication Data
US 2020/0104482 A1 Apr. 2, 2020

Related U.S. Application Data

(60) Provisional application No. 62/739,089, filed on Sep. 28, 2018.

(51) Int. Cl.
| | |
|---|---|
| *H04L 29/06* | (2006.01) |
| *G06F 21/51* | (2013.01) |
| *G06F 16/957* | (2019.01) |
| *G06F 16/955* | (2019.01) |

(52) U.S. Cl.
CPC .......... *G06F 21/51* (2013.01); *G06F 16/9558* (2019.01); *G06F 16/9574* (2019.01); *G06F 16/9577* (2019.01); *H04L 63/0227* (2013.01)

(58) Field of Classification Search
CPC .. G06F 21/15; G06F 16/9574; G06F 16/9558; G06F 16/9577; H04L 63/0227
See application file for complete search history.

(56) References Cited

U.S. PATENT DOCUMENTS

| | | | |
|---|---|---|---|
| 2003/0018885 A1* | 1/2003 | Landsman | G06Q 30/0268 713/2 |
| 2008/0046975 A1* | 2/2008 | Boss | G06F 21/52 726/4 |
| 2009/0282476 A1* | 11/2009 | Nachenberg | G06F 21/577 726/22 |
| 2010/0064369 A1* | 3/2010 | Stolfo | G06F 21/566 726/24 |
| 2010/0186088 A1* | 7/2010 | Banerjee | H04L 63/1441 726/23 |

(Continued)

OTHER PUBLICATIONS

Dachuan Yu et al., JavaScript Instrumentation for Browser Security, Jan. 2007, ACM, vol. 42, Issue 1, pp. 237-249. (Year: 2007).*

(Continued)

*Primary Examiner* — Luu T Pham
*Assistant Examiner* — Fahimeh Mohammadi
(74) *Attorney, Agent, or Firm* — Fenwick & West LLP

(57) ABSTRACT

A pop-up blocker application detects and remediates malicious pop-up loops. The pop-up blocker application intercepts a call from a web page for initiating a pop-up browser window in a web browser. The pop-up blocker application updates a count of pop-up initiating calls associated with the web page occurring within a pre-defined time window. The updated count is compared to a threshold to determine whether the count meets a threshold indicative of a malicious pop-up loop. Responsive to the count meeting the threshold, the pop-up blocker applications takes a remedial action, such as navigating away from the web page.

17 Claims, 3 Drawing Sheets

(56) References Cited

U.S. PATENT DOCUMENTS

| | | | | |
|---|---|---|---|---|
| 2012/0159620 A1* | 6/2012 | Seifert | ............... | H04L 63/1416 |
| | | | | 726/22 |
| 2013/0179981 A1* | 7/2013 | Bekker | .............. | G06F 21/6218 |
| | | | | 726/26 |
| 2014/0041048 A1* | 2/2014 | Goodwin | ............. | H04L 63/101 |
| | | | | 726/27 |
| 2014/0310809 A1* | 10/2014 | Li | ........................... | G06F 21/84 |
| | | | | 726/23 |
| 2014/0331119 A1* | 11/2014 | Dixon | .................. | H04L 63/168 |
| | | | | 715/234 |
| 2015/0082206 A1* | 3/2015 | Low | ...................... | G06F 3/0481 |
| | | | | 715/760 |
| 2017/0083486 A1* | 3/2017 | van der Horst | ..... | G06F 16/9577 |
| 2018/0139180 A1* | 5/2018 | Napchi | ................ | G06F 21/554 |
| 2019/0036930 A1* | 1/2019 | Bartik | .................. | G06F 21/577 |
| 2019/0266327 A1* | 8/2019 | Satpathy | .............. | G06F 21/568 |

OTHER PUBLICATIONS

Karen McDowell, Now That We Are All So Well-Educated about Spyware, Nov. 2006, ACM, pp. 235-239 (Year: 2006).*

Merrill Warkentin et al., A Framework for Spyware Assessment, Aug. 2005, ACM, vol. 48, Issue 8, pp. 79-84. (Year: 2005).*

Arash Habibi Lashkari et al., CIC-AB: Online Ad Blocker for Browsers, Oct. 23-26, 2017, IEEE, pp. 2-7. (Year: 2017).*

* cited by examiner

INTELLIGENT POP-UP BLOCKER

CROSS REFERENCE TO RELATED APPLICATIONS

This application claims the benefit of U.S. Provisional Application No. 62/739,089, filed Sep. 28, 2018, which is incorporated by reference in its entirety.

TECHNICAL FIELD

The present disclosure generally relates to malware detection and more specifically to detecting and remediating browser locking pop-up loops.

BACKGROUND

A browser-locking pop-up loop is a type of malware embedded in a web page that effectively locks a web browser by initiating pop-up windows in an infinite loop so that a user cannot navigate away from the web page. Infinite pop-up loops can negatively interfere with interactions of the user with the computer system by preventing the user from performing other productive tasks. Furthermore, scammers often employ malicious pop-up loops in tech support scams ("TSS") in which the browser becomes effectively locked and a web page is presented indicating that the system is infected. The web page may further suggest that the user arrange payment to a scammer or allow the scammer access to the user's system in order to clean up the system.

SUMMARY

A method detects and remediates pop-ups indicative of malicious pop-up loops. A pop-up blocker application intercepts a call to initiate a pop-up window from a web page. A count associated with the call to initiate a pop-up window originating from the web page is updated for a pre-defined time window. The count for the call is compared to a threshold count indicative of a malicious pop-up loop. Responsive to the count meeting the threshold, action is taken to remediate the pop-up loop.

In some embodiments, the call to initiate a pop-up window may be compared to a list of predefined calls. The web page from which the call is made may also be compared to a whitelist to determine if the web page is trusted. Furthermore, in some embodiments, remedial action can include blocking the web page, closing the web page, and/or directing the user away from the web page.

In another embodiment, a non-transitory computer-readable storage medium stores instructions that when executed by a processor causes the processor to execute the above-described method.

In yet another embodiment, a computer system includes a processor and a non-transitory computer-readable storage medium that stores instructions for executing the above-described method.

BRIEF DESCRIPTION OF THE DRAWINGS

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A pop-up blocker application detects and remediates malicious pop-up loops that operate to lock a web browser. The pop-up blocker application intercepts a call made by a web page to initiate a pop-up window in a web browser and updates a count corresponding to similar calls made by the web page within a time window. The pop-up blocker application compares the count to a threshold count indicative of a malicious pop-up loop. The pop-up blocker application remediates the pop-up loop in response to the count meeting the threshold. Beneficially, the pop-up blocker application intelligently remediates pop-up loops having malicious characteristics (e.g., locking a web browser) without interfering with other non-malicious pop-up windows. Furthermore, the pop-up blocker application allows a user to navigate away from a web page that has been locked by a malicious pop-up loop to enable the user to perform other productive tasks.

Figure 1:
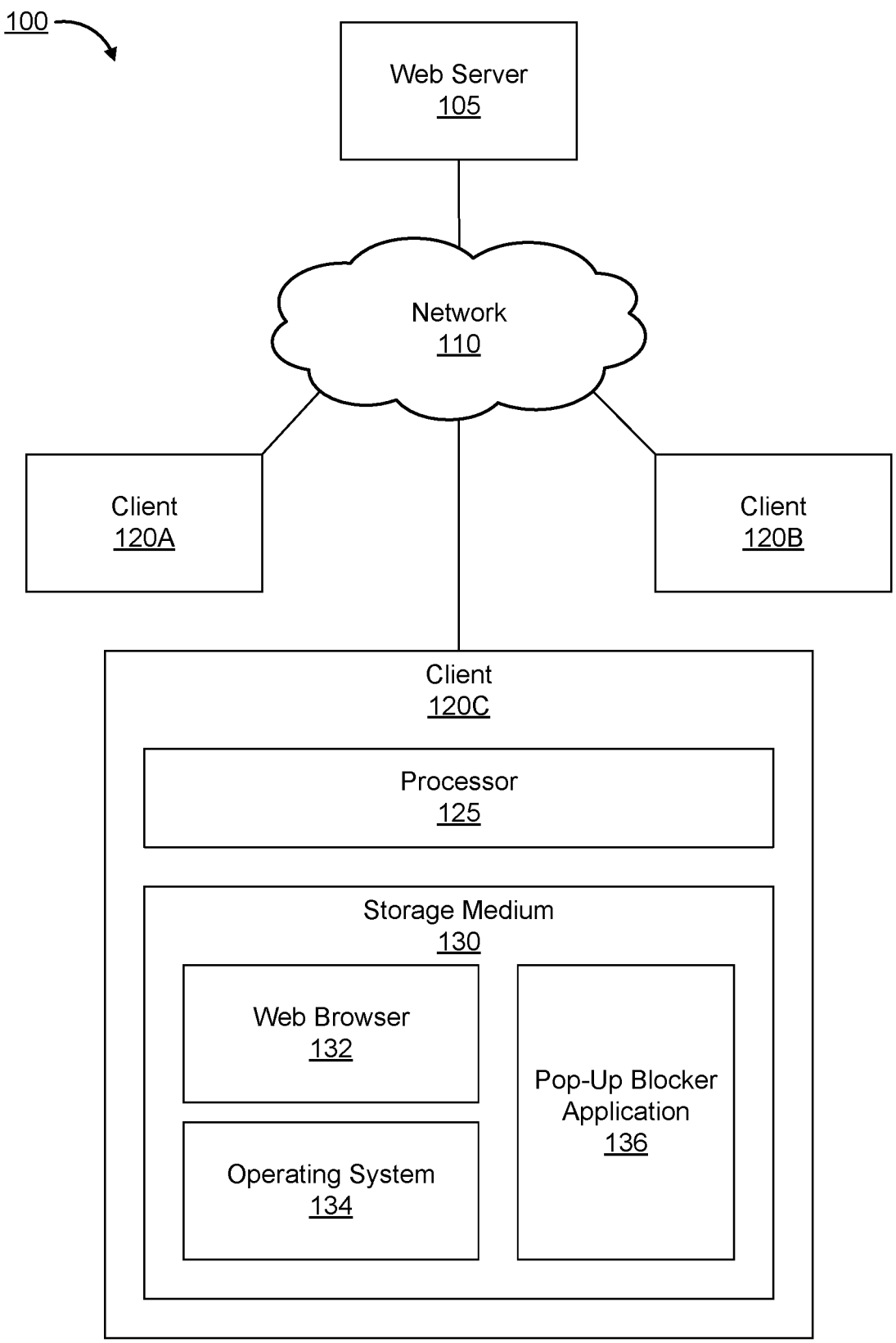
FIG. 1 is a high-level block diagram of a system environment for a pop-up blocker application, according to one or more embodiments.

FIG. 1 is a high-level block diagram illustrating a system environment 100 for a pop-up blocker application, according to one or more embodiments. The system environment 100 includes a web server 105, a network 110, and various clients 120A, 120B, 120C (collectively referenced herein as clients 120). For simplicity and clarity, only one web server 105 and a limited number of clients 120 are shown. In other embodiments, the system environment 100 can include different numbers of web servers 105 and clients 120. Furthermore, the system environment 100 may include different or additional entities not described herein.

The network 110 represents the communication pathways between the web server 105 and the clients 120. In one embodiment, the network 110 includes the Internet. The network 110 can also utilize dedicated or private communications links that are not necessarily part of the Internet. In one embodiment, the network 110 uses standard communications technologies and/or protocols. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The web server 105 hosts web pages that may be accessible to the clients 120 via a web browser 132. One or more hosted web pages may be malicious in nature. For example, the web server 105 may host a web page that when loaded, causes a loop of pop-ups (e.g., an infinite loop) that a client 120 cannot dismiss because closing a pop-up causes a new pop-up to be loaded. This pattern effectively locks the web browser 132 and prevents the user from navigating away from the web page. In an embodiment, the web page may initiate each pop-up by calling a Javascript API command such as alert( ), prompt( ), confirm( ), etc. Other commands to initiate pop-ups may include a print function (e.g., generating a print preview pop-up), a 'fullscreenchange' callback (e.g., pop-up to open browser in full screen), and a request for user credentials (e.g., authentication required pop-ups).

Each client 120 includes one or more computing devices capable of processing, transmitting, and/or receiving data via the network 110. For example, a client 120 may be device such as a desktop computer, a laptop computer, a smart phone, a tablet computing device, an Internet of Things (IoT) device, or any other device having computing and data communication capabilities. Each client 120 includes a processor 125 for manipulating and processing data, and a storage medium 130 for storing data and program instructions associated with various applications including an operating system 134, a web browser 132, and a pop-up blocker application 136. The storage medium 130 may include both volatile memory (e.g., random access memory) and non-volatile storage memory such as hard disks, flash memory, flash drives, external memory storage devices, USB drives, discs and the like. In addition to storing program instructions, the storage medium 130 stores data associated with operation of the operating system 134, the web browser 132, and the pop-up blocker application 136.

In one embodiment, the storage medium 130 includes a non-transitory computer-readable storage medium. Various executable programs (e.g., the operating system 134, web browser 132, and pop-up blocker application 136) are each embodied as computer-executable instructions stored to the non-transitory computer-readable storage medium. The instructions, when executed by the processor 125, cause the client 120 to perform the functions attributed to the programs described herein.

The operating system 134 is a specialized program that manages computer hardware resources of the client 120 and provides common services to the web browser 132. An operating system 134 may manage the processor 125, storage medium 130, or other components not illustrated such as, for example, a graphics adapter, an audio adapter, network connections, disc drives, and USB slots. Because many programs and executing processes compete for the limited resources provided by the processor 125, the operating system 134 may manage the processor bandwidth and timing to each requesting process.

The web browser 132 comprises an application for accessing and displaying web pages on the network 110. The web browser 132 may display a web page in a window, which may include a pop-up window. The web browser 132 can include one or more browser extensions, plug-ins, or other applications that add additional functionality to the web browser 132.

The pop-up blocker application 136 may detect and intercept a call from the web browser 132 for initiating a pop-up window. Upon intercepting the call, the pop-up blocker application 136 causes the web browser 132 to execute a proxy code. The proxy code tracks the number of times a pop-up initiating call is made from the web page within a predefined time window. The pop-up blocker application 136 then detects behavior indicative of a malicious pop-up loop based on the tracked calls. For example, in one embodiment, if a pop-up initiating call is made from the same network address more than a threshold N number of times during a pre-defined time window M, the pop-up blocker application 136 may classify the behavior as indicative of a malicious pop-up loop and cause the web browser 132 and perform a remedial action. In one embodiment, typical values may be N=3 and M=10 seconds. In another embodiment, N may have a range from 3-5 and M may have a range from 5-15 seconds. In some embodiments, the values of N and M may depend on the type of call. In alternative embodiments, N and M can have any suitable values for detecting behavior indicative of a pop-up loop. The remedial action may comprise, for example, causing the web browser 132 to navigate away from the malicious web page. For example, the pop-up blocker application 136 may cause the web browser 132 to navigate to a safe web page that informs the user that the remedial action was taken in response to detecting the malicious pop-up loop. In another embodiment, the remedial action may include adding the web page to a blacklist of web pages for which all pop-up windows will be blocked or for which the malicious web page will be blocked entirely.

If the pop-up blocker application 136 detects a pop-up initiating call but the count has not exceeded the threshold, the pop-up blocker application 136 may allow the pop-up initiating call to proceed. Alternatively, the pop-up blocker application 136 may delay allowing the pop-up initiating call to execute until it determines that the web page is not malicious. For example, if a second threshold period of time passes without the pop-up blocker application 136 detecting a malicious pop-up loop, the pop-up blocker application 136 may determine that the pop-up initiating call is not part of a malicious behavior pattern and allow the call to proceed.

In an embodiment, the pop-up blocker application 136 is embodied as an extension or plug-in associated with the web browser 132. The pop-up blocker application 136 is described in further detail below.

Figure 2:
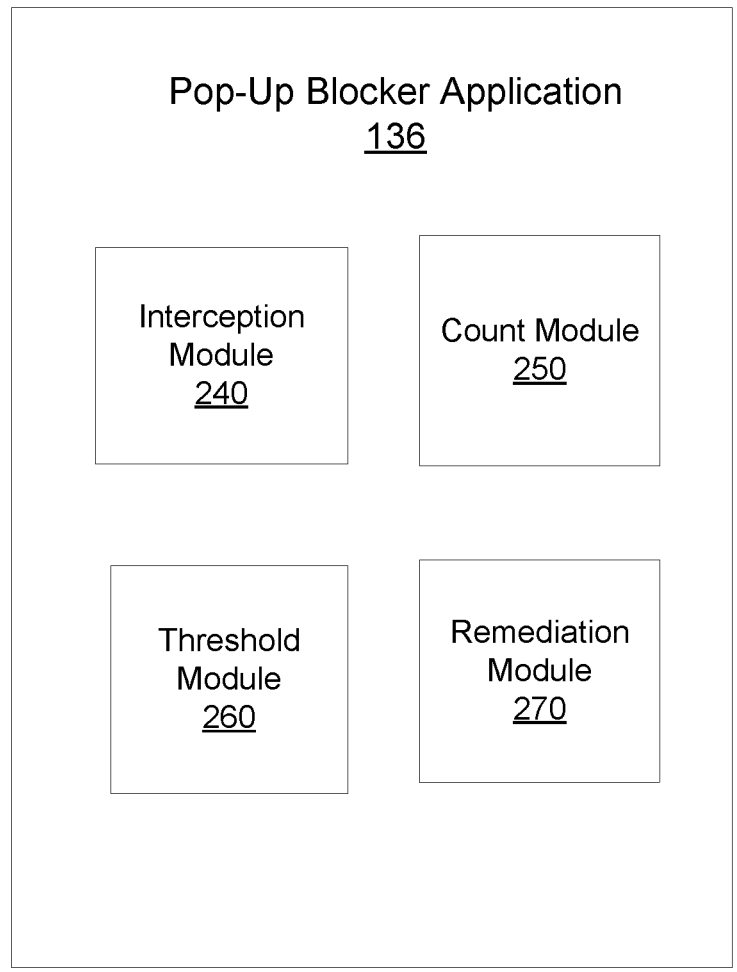
FIG. 2 is a block diagram of a pop-up blocker application, according to one or more embodiments

FIG. 2 is a high level block diagram of the pop-up blocker application 136. The pop-up blocker application 136 includes an interception module 240, a count module 250, a threshold module 260, and a remediation module 270. In other embodiments, the pop-up blocker application 136 can include fewer or greater components than described herein. The components may also have alternate functions than described.

The interception module 240 detects and intercepts a call from a web page executed by the web browser 132. The interception module 240 may specifically detect calls that initiate a pop-up browser window in the web browser 132 and track the time at which a call was made and the web page from which a call was made. In some embodiments, a call detected by the interception module 240 may be compared to a predefined list of calls that initiate a pop-up window in a web browser 132

The interception module 240 may also compare a web page to a whitelist prior to intercepting a call from the web page. The whitelist is a list of web pages that are trusted. If a web page is included on the whitelist, calls from the web page are not considered malicious and are not intercepted by the interception module 240.

The count module 250 analyzes the number of times a pop-up initiating call is made from a web page within a predefined time window. In an embodiment, the count module 250 records an entry in a call log corresponding to the intercepted call. The entry may include a time associated with an intercepted call and an identifier for a web page from where the intercepted call was made. Based on the call log, the count module 250 identifies a subset of log entries (e.g., N entries) within a predefined time window (e.g., M seconds) pertaining to historical calls made by the web page associated with initiating a pop-up browser window. A count is generated based on the subset of log entries for the predefined time window.

The threshold module 260 determines if the behavior of the web page is malicious based on the count generated by the count module 250. In one embodiment, the threshold module 260 compares the count of pop-up initiating calls made by the web page within the time window to a predefined threshold count, and determines that the web page is malicious in response to the count exceeding the predefined threshold count. For example, the threshold module 260 may classify a behavior as indicative of a malicious pop-up loop if the count exceeds 10 calls in 30 seconds. Alternatively, the threshold module 260 may apply different thresholds for different types of calls on the predefined list of calls.

The remediation module 270 initiates a remedial action in response to the threshold module 260 detecting that the count exceeds the threshold in order to remediate a malicious pop-up loop. Particularly, the remediation module 270 takes one or more actions to prevent the web browser 132 from being locked by a loop of pop-ups. For example, the remediation module 270 may perform one or more actions such as blocking subsequent pop-up initiating calls from the web page, closing the web page, closing the web browser 132, or navigating away from the malicious web page. The remediation module 270 may furthermore provide a message to a client 120 to indicate that the web page is malicious and inform the user of the action taken. The remediation module 270 may also add the web page associated with the call to a blacklist of web pages that the web browser 132 is blocked from accessing. Alternatively, the remediation module 270 may be configured to block all pop-up initiating calls from the web page without necessarily blocking access to the web page. The remediation module 270 may furthermore send a notification to a central malware detection server indicative of the detected malicious activity. The central malware detection server may then update blacklists associated with other clients 120 on the network 110 to prevent other clients 120 from accessing the malicious web page.

Figure 3:
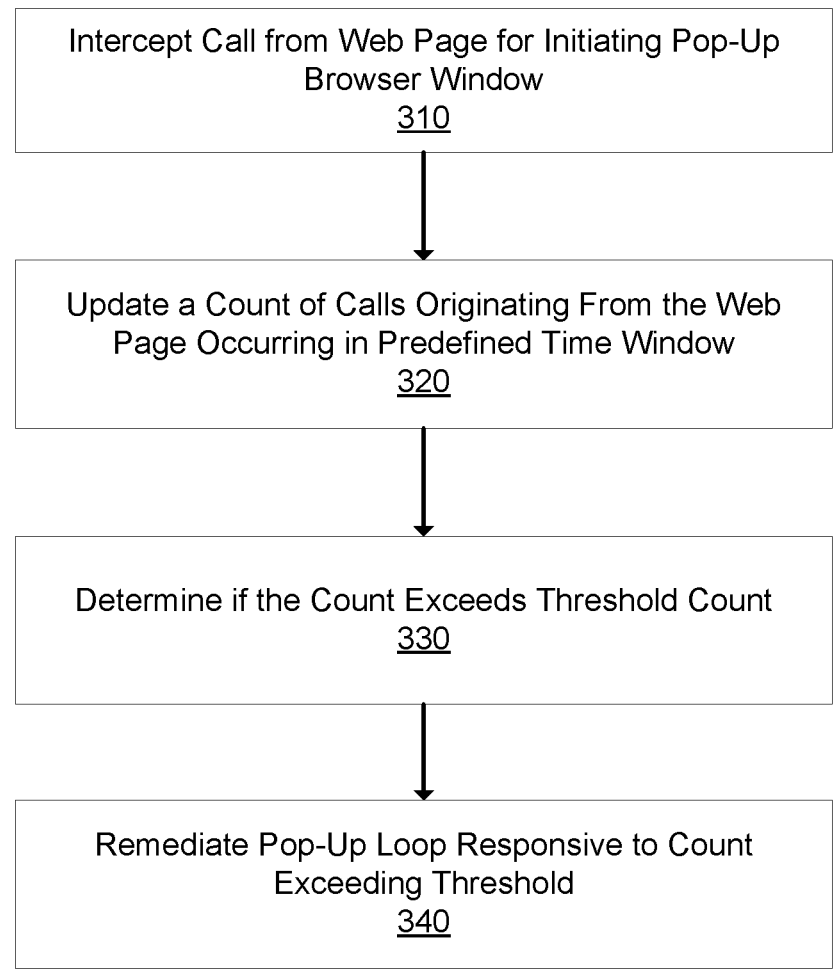
FIG. 3 is a flowchart illustrating a method of blocking pop-ups, according to one or more embodiments.

FIG. 3 is a flow chart of a method for detecting and remediating a malicious pop-up loop. The interception module 240 intercepts 310 a call for initiating a pop-up browser window from a web page. The count module 250 updates 320 a count of calls originating from the web page occurring in a predefined time window. The threshold module 260 determines 330 if the count exceeds the threshold count. The remediation module 270 remediates 340 the pop-up loop in response to the count exceeding the threshold count.

The embodiments described above beneficially detect and block malicious pop-ups without necessarily blocking all pop-ups (some of which may be desirable) and without requiring the user to manually shut down the browser via a task manager application. As such, the pop-up blocker application 136 may beneficially thwart TSSs and other browser locking attacks and allow users to navigate away from a web page in order to perform other productive tasks.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A computer-implemented method for detecting and remediating a pop-up loop having malicious characteristics, the method comprising:
intercepting, by a computer, a call from a webpage for initiating a pop-up browser window in a web browser;
updating, based on the call, by the computer, a count tracking a number of calls initiating pop-up browser windows, wherein the calls are associated with the webpage and occurred within a predefined time window, wherein updating the count comprises:
recording, in a call log, an identifier for the webpage and a time associated with the call;

identifying, based on the call log, a subset of log entries pertaining to historical calls made by the web page associated with initiating the pop-up browser window and occurring within the predefined time window; and
generating the count based on the identified subset;
determining, by the computer, whether the count exceeds a threshold count indicative of the pop-up loop; and
responsive to the count exceeding the threshold count, classifying the calls as indicative of a malicious pop-up loop; and
responsive to classifying the calls as indicative of a malicious pop-up loop, performing, by the computer, a remedial action to remediate the pop-up loop.

2. The method of claim 1, wherein remediating the pop-up loop comprises:
causing the browser to navigate away from the webpage and close the pop-up browser window.

3. The method of claim 1, further comprising:
responsive to the count exceeding the threshold, updating, by the computer, a blacklist of malicious webpages for blocking by the web browser to include the web page.

4. The method of claim 1, further comprising:
comparing an identifier of the webpage against a whitelist of trusted webpages; and
determining, by the computer, that the webpage is not included on the whitelist prior to intercepting the call.

5. The method of claim 1, wherein intercepting the call comprises:
comparing the call to a list of predefined calls; and
determining, by the computer, that the call is included on the list of predefined calls.

6. The method of claim 1, wherein remediating the pop-up loop comprises:
sending an identifier of the web page to a central malware detection server to cause the server to add the web page to a blacklist.

7. A non-transitory computer-readable storage medium storing instructions for detecting and remediating a pop-up loop, the instructions when executed by a processor cause the processor to perform steps including:
intercepting, by a computer, a call from a webpage for initiating a pop-up browser window in a web browser;
updating, based on the call, by the computer, a count tracking a number of calls initiating pop-up browser windows, wherein the calls are associated with the webpage and occurred within a predefined time window, wherein updating the count comprises:
recording, in a call log, an identifier for the webpage and a time associated with the call:
identifying, based on the call log, a subset of log entries pertaining to historical calls made by the web page associated with initiating the pop-up browser window and occurring within the predefined time window; and
generating the count based on the identified subset;
determining, by the computer, whether the count exceeds a threshold count indicative of the pop-up loop; and
responsive to the count exceeding the threshold count, classifying the calls as indicative of a malicious pop-up loop; and
responsive to classifying the calls as indicative of a malicious pop-up loop, performing, by the computer, a remedial action to remediate the pop-up loop.

8. The non-transitory computer-readable storage medium of claim 7, wherein the instructions when executed further cause the processor to perform steps including:
causing the browser to navigate away from the webpage and close the pop-up browser window.

9. The non-transitory computer-readable storage medium of claim 7, wherein the instructions when executed further cause the processor to perform steps including:
responsive to the count exceeding the threshold, updating a blacklist of malicious webpages for blocking by the web browser to include the web page.

10. The non-transitory computer-readable storage medium of claim 7, wherein the instructions when executed further cause the processor to perform steps including:
comparing an identifier of the webpage against a whitelist of trusted webpages; and
determining that the webpage is not included on the whitelist prior to intercepting the call.

11. The non-transitory computer-readable storage medium of claim 7, wherein intercepting the call comprises:
comparing the call to a list of predefined calls; and
determining that the call is included on the list of predefined calls.

12. The non-transitory computer-readable storage medium of claim 7, wherein remediating the pop-up loop comprises:
sending an identifier of the web page to a central malware detection server to cause the server to add the web page to a blacklist.

13. A computing system comprising:
a processor; and
a non-transitory computer-readable storage medium storing instructions for detecting and blocking a pop-up loop, the instructions when executed by the processor cause the processor to perform steps including:
intercepting, by a computer, a call from a webpage for initiating a pop-up browser window in a web browser;
updating, based on the call, by the computer, a count tracking a number of calls initiating pop-up browser windows, wherein the calls are associated with the webpage and occurred within a predefined time window, wherein updating the count comprises:
recording, in a call log, an identifier for the webpage and a time associated with the call:
identifying, based on the call log, a subset of log entries pertaining to historical calls made by the web page associated with initiating the pop-up browser window and occurring within the predefined time window; and
generating the count based on the identified subset;
determining, by the computer, whether the count exceeds a threshold count indicative of the pop-up loop; and
responsive to the count exceeding the threshold count, classifying the calls as indicative of a malicious pop-up loop; and
responsive to classifying the calls as indicative of a malicious pop-up loop, performing, by the computer, a remedial action to remediate the pop-up loop.

14. The computing system of claim 13, further comprising:
causing the browser to navigate away from the webpage and close the pop-up browser window.

15. The computing system of claim 13, further comprising:
responsive to the count exceeding the threshold, updating, by the computer, a blacklist of malicious webpages for blocking by the web browser to include the web page.

16. The computing system of claim 13, further comprising:
comparing an identifier of the webpage against a whitelist of trusted webpages; and
determining, by the computer, that the webpage is not included on the whitelist prior to intercepting the call.

17. The computing system of claim 13, wherein intercepting the call comprises:
comparing the call to a list of predefined calls; and
determining, by the computer, that the call is included on the list of predefined calls.

* * * * *